April 2, 1968        B. B. CHICK        3,376,504
DIGITAL COARSE AND ANALOG FINE TIME INTERVAL MEASUREMENT
Filed June 4, 1964
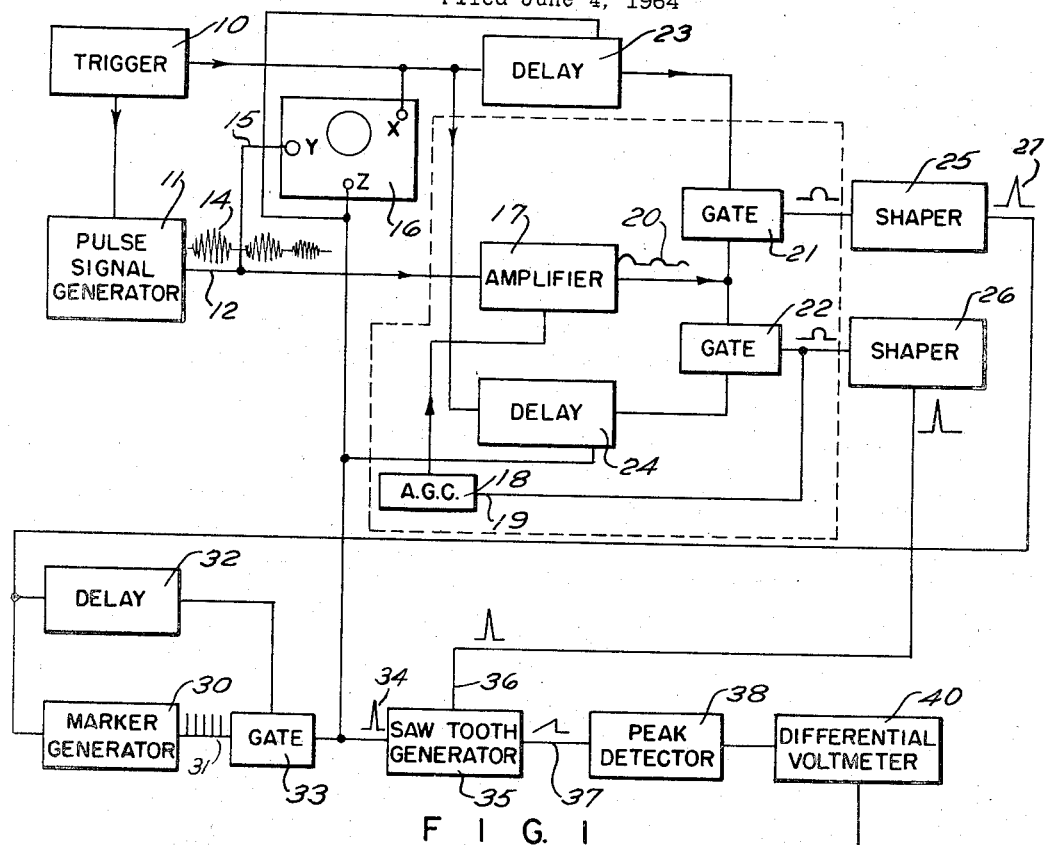
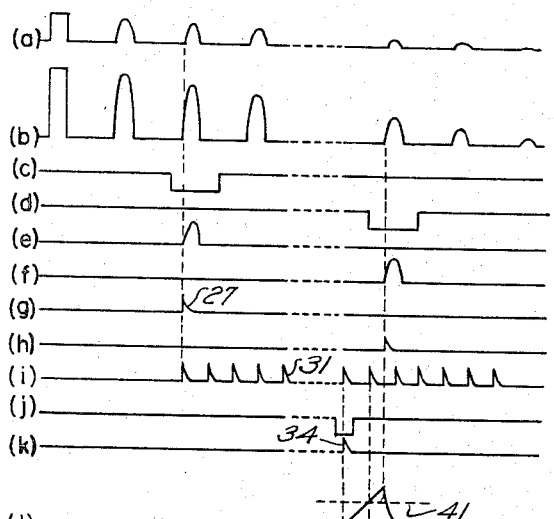
FIG. 3
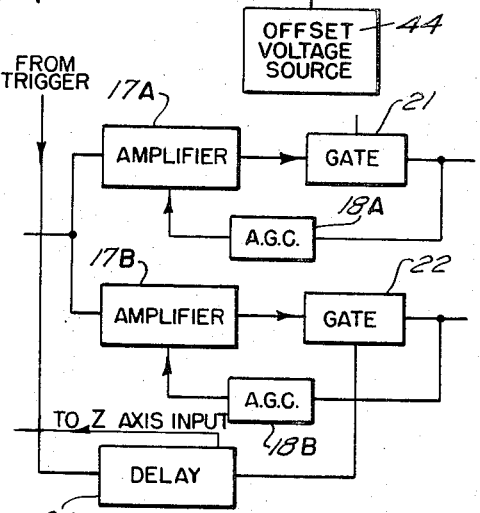
FIG. 2
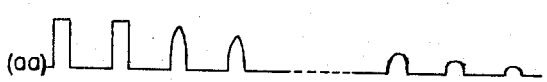
INVENTOR
BRUCE B. CHICK
BY
Barlow & Barlow
ATTORNEYS of Apr. 2, 1968

United States Patent Office 3,376,504
Patented Apr. 2, 1968

3,376,504
DIGITAL COARSE AND ANALOG FINE
TIME INTERVAL MEASUREMENT
Bruce B. Chick, 235 Pleasant St.,
East Providence, R.I. 02916
Filed June 4, 1964, Ser. No. 372,581
4 Claims. (Cl. 324—68)

This invention relates to a time interval measurement device which accurately measures the spacing between two coherent repetitive pulses.

The present invention discloses a device for measuring time intervals especially in connection with ultra-sonic testing techniques and combines the accuracy of digital systems for a course readout and an improved analog system for fine measurement.

It is the general object of this invention to provide a device which will measure the time between two coherent repetitive pulses with an order of sensitivity of one nanosecond.

It is a further object of this invention to provide an output from the device in the form of a voltage which voltage can actuate a recorder so that the dynamic changes in time that cannot be measured manually will produce a permanent record.

A still further object of the invention is to provide a device which is entirely independent of variations in repetition rate in the pulse signal source.

With reference to the drawings:

FIG. 1 is a general block diagram illustrating the device of the invention;

FIG. 2 is a block diagram of a modified form; and

FIG. 3 is a series of diagrams showing the pulses as they exist in various portions of the device.

Referring now more specifically to the drawing and particularly to FIG. 1, there is shown a trigger source of pulses 10 which trigger source has an output that keys a pulse signal generator 11 so that at the output 12 of this generator there will be produced an exponentially decaying group of echoes such as 14. The output 12 of the pulse signal generator is fed to the input of an amplifying device 17. The output of the pulse generating device is fed to the Y axis input of an oscilloscope 16. It is desirable that the amplifier 17 exhibit substantial gain something on the order of 80 db and have a bandwidth on the order of 5 megacycles. Associated with the amplifier is an A.G.C. system 18 operating from the particular gated echo that senses a level at its input 19 and effectively controls the gain of the amplifier 17 to maintain the output constant preferably within plus or minus 1 db over a range of at least a 40 db level of input signal. It thus will be appreciated by those skilled in the art that the amplifier 17 should be of a type whose quality characteristics are not altered by the presence of the automatic gain control voltage such that there should not be observable a change in center frequency or bandwith over the entire desired dynamic range of gain control which in this instance was set at 40 db. It should further be noted that the output of the amplifier 17 as at 20, is a detected type of output. Accordingly, the output stage of the amplifier should have a detecting characteristic so that the wave form at the output thereof will in effect be a series of decaying amplitude pulses rather than a decaying wave train. The output of the amplifier will therefore appear as $a$ in FIG. 3 without A.G.C. operating on the selected echo, and as at $aa$ with the A.G.C. operating on a selected second echo, the earlier echoes saturating as shown. This signal is then fed to a pair of gating devices 21 and 22 which can also be termed for ease of description an echo selector.

To achieve this descriptive function of selecting echoes, the gates 21 and 22 are keyed from the main trigger source 10 with effectively delayed triggers. This is easily achieved by inserting a delay means between the output of the trigger 10 and the input of the gates 21 and 22. In this instance there is shown a delay means 23 associated with gate 21 and delay means 24 associated with gate 22. In the process of selecting the echoes, it is of course obvious that what we are trying to do is to select two succeeding echoes and accordingly the delay means 23 and 24 are adjusted so that this will occur. The outputs of delay means 23 and 24 which are shown at $c$ and $d$ respectively, are also fed to the Z axis of the oscilloscope so as to brighten the two selected echoes. The output, therefore, of the gates 21 and 22 appear as single pulses occurring at spaced intervals on a common time base as seen at $e$ and $f$, are then fed into shaping networks 25 and 26 respectively which changes the rise time and general shape of the pulse into a sharp spiked device as shown at $g$ and $h$. The output of gate 22 is also fed to the input 19 of the automatic gain control network 18 to control the gain of the amplifier 17 for the purposes alluded to before. Following first the output of the shaper 25, the pulse 27 is fed to a marker generator 30 and simultaneously to a delay means 32.

This pulse that arises from the shaper 25, now simultaneously triggers the delay means 32 and the marker generator 30 which in the instant case produces 1 microsecond markers 31 for a 200 microsecond burst as shown at $i$. The output of this marker generator is fed into a gate 33 and since the output of the delay 32 as shown at $j$ is fed to the gate 33 it makes it possible by manually varying the delay of the delay means 32 to select any marker that is produced by the generator 30 from the second through the 200 with a 200 microsecond burst being produced. The selected marker 34 which appears at the output of the gate 33, see $k$ in FIG. 3, is fed to the input of a sawtooth generator and is used as a turn-on device or trigger device to initiate the start of the sawtooth generation. Also the output of this gate 33 is fed to the Z axis of the oscilloscope 16 in order to brighten the baseline just prior to the second selected echo. Accordingly proper manual setting of the delay 32 may be achieved by reference to the oscilloscope 16. It will also be noted that coupled to the sawtooth generator 35 is the output of the shaper 26 which again is a trigger pulse and is the second selected pulse of the wave train which is being measured. This pulse is fed into the sawtooth generator as at 36 and serves as a turn-off device to terminate the production of the sawtooth. Accordingly, at the output 37 of the sawtooth generator 35 we will have a sawtooth whose degree of rise will change directly as the time spaced relationship between the first and second selected echoes which effect is shown at $l$ in FIG. 3. It is a simple matter, therefore, to feed the output of the saw-tooth generator 37 into a peak detector means 38 which then has its output fed into a differential voltmeter 40 that will have fed to it an offset voltage such as shown at 41 from a source 44 which is effectively the introduction of voltage to compensate for the first microsecond of operation of the saw-tooth generator. This offset voltage input source to the balanced differential voltmeter will, therefore, allow analog measurements to go to zero which would be an impossibility to obtain on a linear basis if the saw-tooth had to really be measured back to a true zero voltage which would be at 42 in FIG. 3. It follows also that the delay device 32 will have to be calibrated to account for the so-called lost one microsecond. In this fashion the calibration will indicate the coarse measurement.

It will be appreciated, therefore, that one limitation of the present system is that the minimum time that can be measured between pulses is one microsecond (the spacing of the markers from generator 30) but for most measurement purposes, this does not present any real difficulty since the time between pulses is usually greater than this value. The normal analog reading is 0–1 microsecond and when displayed on a recorder with 100 divisions each minor division would represent 10 nanoseconds. However, if the offset voltage is variable and calibrated in proper units of time, it is possible to adjust the readout voltage to be near zero. Then if the voltmeter sensitivity is increased by a factor of ten, it is possible to easily see 1 nanosecond time changes. Over the maximum time span of 200 microseconds then this is a resolution of 1 part in $2 \times 10^5$.

Referring now to FIG. 2 of the drawing, there is shown a modified form of achieving the desired pulse selection. As shown in FIG. 1, the automatic gain control is responsive to the pulse height of the selected echo. This is necessary since the amplitude of the selected echo is not necessarily constant with time, but the shaper circuits require constant amplitude for the overall system to produce accurate results. If the amplitude ratio of the two selected echoes changes during measurement, it is necessary to separate the amplifier 17 into two channels. Accordingly, in FIG. 2 we have illustrated the amplifier 17 as comprising two channels 17a and 17b. Channel amplifier 17a has an automatic gain control 18a which will control the amplitude of the first selected echo; while channel amplifier 17b has a gain control 18b that controls the amplitude of the second echo. In all other respects the circuitry is identical. However, one further modification suggests itself, and that concerns the delay networks 23 and 24. As will be appreciated by those skilled in the art, a delay network such as delay network 24 requires an extremely wide range of delay and is on the order of twice the delay necessary in network 23. Therefore, to keep the size of the components down to a minimum, it may be desirable in many instances to serially arrange the delay networks 23 and 24 such that the output of delay network 23 feeds the input of delay network 24. In this fashion, the size of delay network 24 can be kept to a minimum it not being necessary to provide the long delay necessary to select the trailing group of pulses. The sequence of operations may be easily followed in FIG. 3, where lines a and b are the detected outputs of the two amplifiers 17a and 17b, the gain of each of the amplifiers being controlled by the amplitude of the selected pulses. Lines c and d show the output of the delay networks 23 and 24, respectively; while lines e and f show the selected echoes being passed by the gate means 21 and 22, respectively. After the selected echoes have passed through their shapers 25 and 26, the form of the pulses is shown on lines g and h. The pulse output of shaper 25 triggers the burst generator or marker generator 30, the output of which is shown at line i. The output of the delay network 32 is shown at j, which output operates the gate 33 and selects the appropriate precision marker as shown in line k. The selected marker pulse as shown in line k then initiates the saw-tooth action of the generator 35 which is terminated by the output of the shaper 26, thus completing the action of the measuring circuit except for the measurement means which has already been alluded to above as consisting of peak detector 38 and a differential voltmeter 40, having an offset voltage source fed in thereto as indicated at 41.

The feasibility of using this device can be readily demonstrated if the delay means 32 is a calibrated delay means having a digital readout device for setting the amount of delay that can occur in the line 32. For example, if the delay is variable in steps of 1 microsecond to 200 microseconds and has a 0.6 microsecond gate, a coarse reading of pulse spacing can easily be obtained. The device has been described in connection with a wave train of R.F. echoes; but any other form of pulses can, of course, be measured within the capability of the basic system with appropriate changes in the amplifying devices.

I claim:
1. Time interval measurement device comprising a source of start and stop signals, a marker generator, the start signal keying said marker generator which initiates a series of accurately spaced markers, a delay means delaying by an adjustable amount the start signal, an AND gate, the AND gate passing a marker pulse upon coincidence of the delayed start signal and said marker pulse, a saw-tooth generator, said selected marker pulse triggering said saw-tooth generator, said stop pulse terminating generation of said saw-tooth, the saw-tooth generator output being fed to a peak detector to measure maximum saw-tooth rise whereby the time interval between said start and stop signals is indicated by the amount of delay from said delay means and the maximum saw-tooth rise.

2. Time interval measurement device as in claim 1 wherein an offset voltage is generated equal to the rise voltage of the saw-tooth between marker pulses whereby the analog readout is on the linear portion of saw-tooth.

3. A trigger source of pulses, a pulse signal generator, said pulses being initiated from said trigger source, a pair of adjustable delay means, said delay means coupled to the trigger source, a pair of gate means, said gate means upon coincidence of the delayed trigger sources and pulses selecting a pair of spaced pulses and means for measuring the time interval between said selected pulses comprising a shaping network for each pulse, a marker generator, the first selected pulse triggering a train of time interval markers from said marker generator, a further delay means and an AND gate, said further delay means delaying by an adjustable amount the first selected pulse, the AND gate passing a marker upon coincidence of the delayed first pulse and said marker, a saw-tooth generator, the gated marker initiating a saw-tooth wave in said generator, said second pulse terminating generation of said saw-tooth wave and means for measurng the time interval between said marker and the peak of said saw-tooth whereby the time interval between said selected pair of pulses is indicated from the amount of delay of said further delay means and by said time interval measurement means.

4. A device as in claim 3 wherein the time interval measurement means comprises a voltage sensitive device responsive to the voltage rise of said saw-tooth in said time interval.

References Cited

UNITED STATES PATENTS

| | | | |
|---|---|---|---|
| 2,738,461 | 3/1956 | Burbeck et al. | 324—68 |
| 3,013,208 | 12/1961 | Voznak | 324—68 |
| 3,072,855 | 1/1963 | Chandler | 328—110 X |
| 3,249,867 | 5/1966 | Hattersley et al. | 324—68 |

OTHER REFERENCES

Electronic Design, "Billionth Second Timer," May 14, 1958.

RUDOLPH V. ROLINEC, *Primary Examiner.*

WALTER L. CARLSON, ARCHIE R. BORCHELT,
*Examiners.*

PAUL F. WILLE, *Assistant Examiner.*